July 30, 1935.　　　　　J. W. FREE　　　　　2,009,884
PIPE TRIMMING DEVICE
Filed Aug. 20, 1929　　　3 Sheets-Sheet 1

INVENTOR
John W. Free
by his attorneys
Byrnes, Stebbins,
Parmelee & Blenko

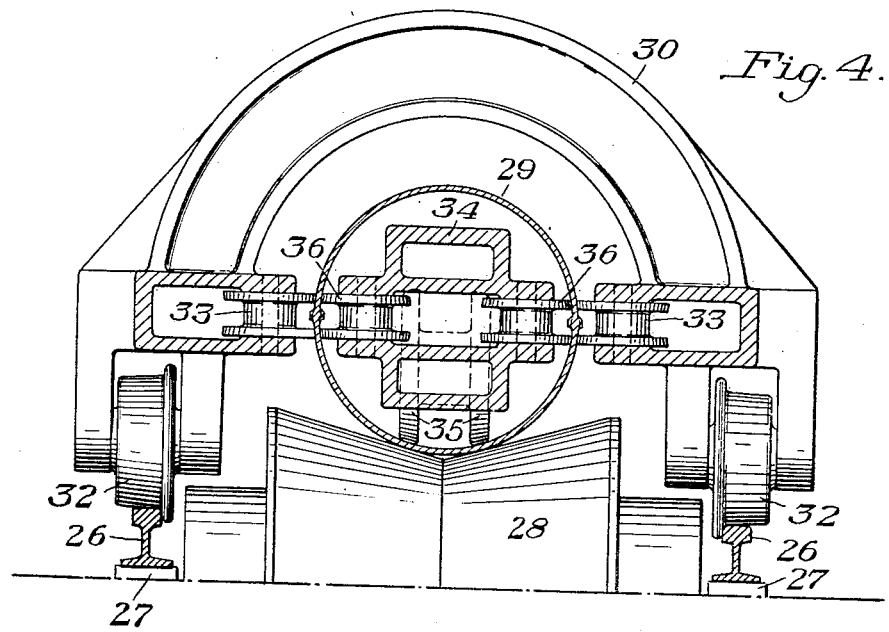
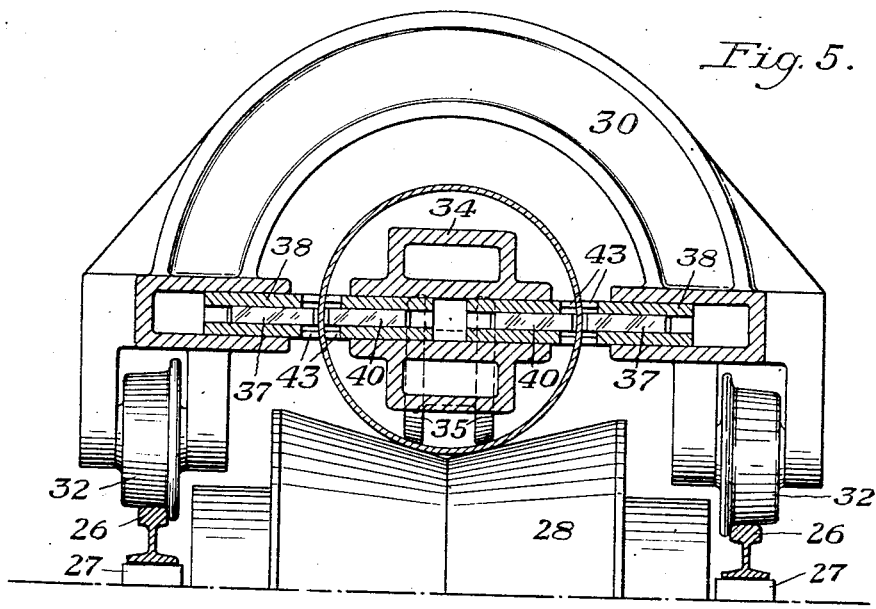

Patented July 30, 1935

2,009,884

UNITED STATES PATENT OFFICE 2,009,884

PIPE TRIMMING DEVICE

John W. Free, Aliquippa, Pa., assignor to Jones and Laughlin Steel Corporation, Pittsburgh, Pa., a corporation of Pennsylvania Application August 20, 1929, Serial No. 387,225

13 Claims. (Cl. 90—38)

My invention relates to the manufacture of pipe and, in particular to a machine for trimming the flash from the seams of a length of flash welded pipe.

When two semi-cylindrical sections are electrically welded to form a pipe, the welding is accompanied by the formation of a "bead" of flash along the seam both on the inside and the outside of the pipe. This flash is objectionable and its removal is necessary to the production of a finished article. Flash trimming by means of hand or pneumatic chisels has proved unsatisfactory because of the high cost thereof and the lack of uniformity in the work, and because of the difficulty of trimming inside the pipe I overcome these objections by a flash trimming machine which will remove the flash quickly and uniformly.

The flash trimming machine of my invention comprises, in general, a fixed base having pipe supporting means thereon and movable trimming means actuated by suitable driving connections. I also provide means for engaging the inner and outer walls of the pipe on both sides of the welded seam. Duplicate internal and external trimming means are also provided so that the flash is removed from the inside and outside of the pipe in a single operation.

For a complete understanding of my invention, reference is made to the accompanying drawings in which Figure 1 is a plan view of a preferred form of my invention.

Figure 4 is a partial vertical section taken along the line IV—IV of Figure 3.

Figure 5 is a similar section on the line V—V of Figure 3.

Figure 1:
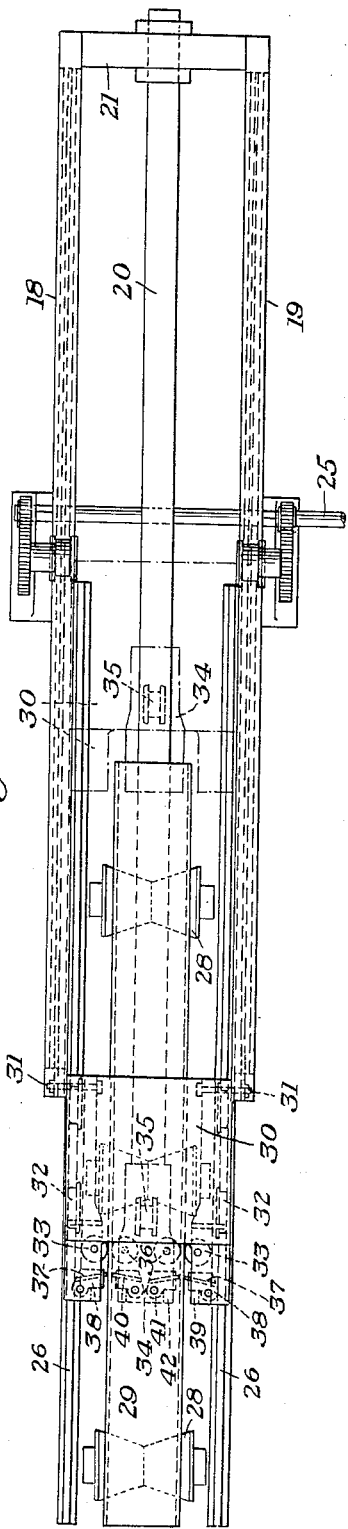
Figure 2:
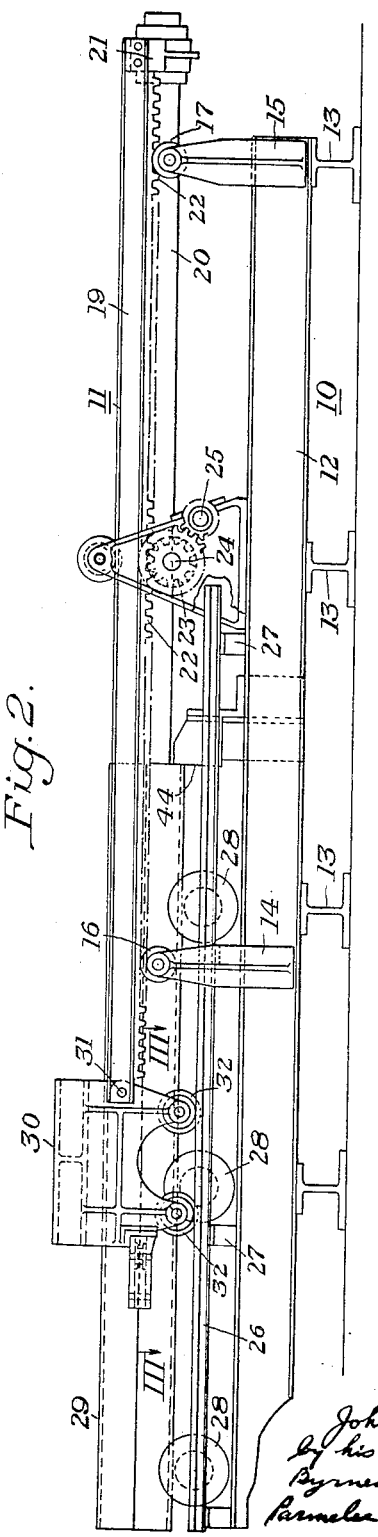
Figure 2 is a side elevation thereof.

Referring in detail to the drawings and particularly to Figures 1 and 2, the flash trimming machine illustrated comprises a fixed base portion 10 and a shiftable superstructure 11. The base portion is preferably built up of structural sections 12 supported on foundation members 13. The base portion 10 carries uprights 14 and 15 which are provided with rolls 16 and 17.

The superstructure 11 consists of a pair of side arms 18 and 19 and a center arm or mandrel 20. The side arms 18 and 19 and the center arm 20 are rigidly connected at one end by means of a cross head 21. The side arms 18 and 19 are provided on their lower sides with rack bars 22 extending throughout the length thereof which are adapted to cooperate with pinions 23 mounted on a shaft 24. The side arms 18 and 19 rest on the rolls 16 and 17 and longitudinal movement thereof is effected by driving the pinions 23 from a drive shaft 25 geared to the pinions 23.

The base portion 10 carries a pair of rails 26 which are mounted on blocks 27 resting on the structural members 12. A plurality of rolls 28 are journaled in the base portion to provide a support for a pipe length 29.

An external tool carrier or yoke 30 is secured to the free ends of the arms 18 and 19 by means of bolts 31. The carrier 30 is provided with wheels 32 which engage the rails 26. A pair of rolls 33 are journaled in the carrier 30 on a vertical axis so as to engage the pipe section 29.

An internal tool carrier 34 is secured to the free end of the mandrel 20 and is provided with a roller 35 which rests on the bottom of the inside of the pipe and horizontal rollers 36 which engage the inside of the pipe at points adjacent those engaged by the rollers 33 journaled in the external tool carrier. This structure may be more readily observed in Figures 3 and 4.

The tool carrier 30 is provided with external cutters 37 which are mounted in pivoted tool holders 38. Abutments 39 limit the pivotal movement of the tool holders 38.

Similar cutters 40 adapted to engage the inside of the pipe are secured to pivoted tool holders 41 mounted on the internal tool carrier. The position of the tool holders 41 is determined by the abutments 42. The tool holders 38 and 41 are provided with projections 43 for engaging the pipe 29 on either side of the welded seam in order to provide additional support for the cutters 37 and 40.

In operation, the superstructure 11 is shifted to its extreme right-hand position by means of the drive shaft 25 and the gearing connecting it to the racks 22. While the carriage comprising the arms 18 and 20 and the internal and external tool carriers 34 and 30 are in this position, a section of welded pipe is placed on the rolls 28, which may be driven by any suitable means, and disposed in the position illustrated in Figure 2, with one end in engagement with an abutment 44 and with the welded seams in a horizontal plane. The carriage 11 is then shifted to the left, the mandrel 20 traversing the inside of the pipe. The pipe wall is engaged between the rollers 36 on the tool carrier 34 and the rollers 33 on the carrier 30. By reason of the pivoted mounting of cutters 37 and 40, the latter are swung out of engagement with the pipe as the carriage moves to the left.

Figure 3:
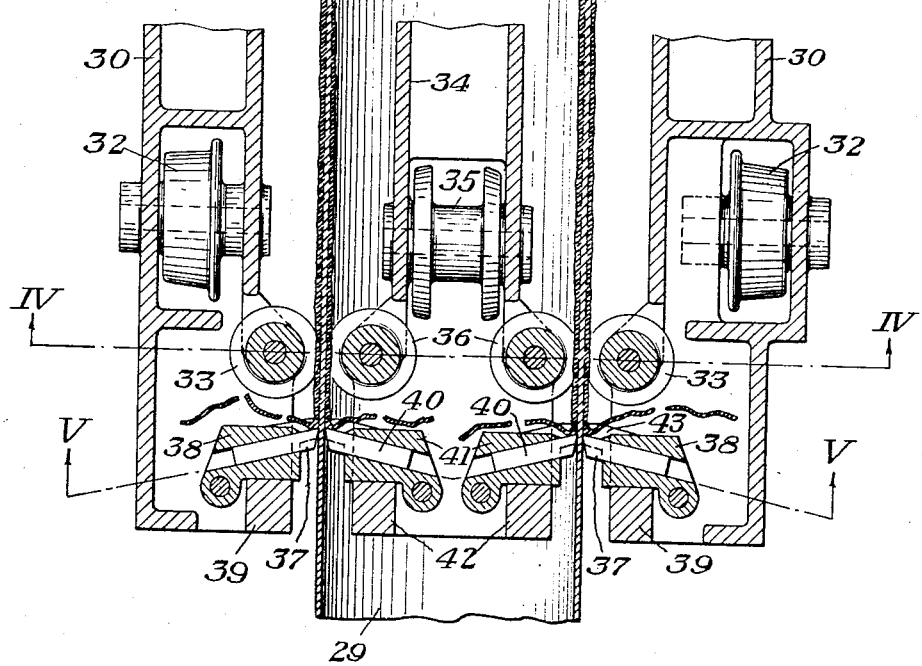
Figure 3 is a partial section taken along the line III—III of Figure 2.
Figure 6:
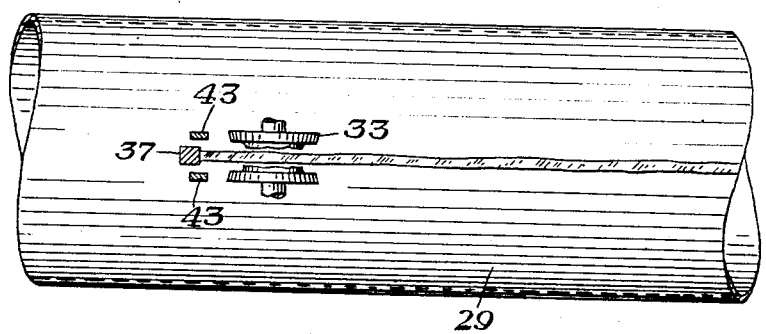
Figure 6 is a partial side view of a pipe section with the flash trimmers shown in section.
Figure 7:
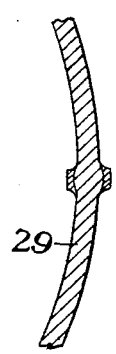
Figure 7 is a partial section of welded pipe showing the seam and the flash formed thereon.

When the carriage has been moved to the left so that the cutters 37 and 40 are at the end of the seams, the carriage is stopped and reversed. As the carriage moves to the right, movement of the pipe 29 toward the right is prevented by its engagement with the stop or abutment 44. The cutters 37 and 40 assume their cutting positions determined by the abutments 39 and 42 and the projections 43 on the holders 38 and 41. As the cutters are drawn along the seams, the flash is trimmed from the latter and a smooth surface at the seams results as shown in Figure 3 and Figure 6.

The dimensions of the machine are such that when the carriage 11 has reached its extreme right-hand position the cutters will have completed the trimming operation. The position of the tool carriers 30 and 34 at such time is indicated in dot and dash lines in Figure 1. The pipe 29 is then removed and an untrimmed pipe substituted therefor.

Among the numerous advantages which characterize the flash trimming machine of my invention may be mentioned the fact that the entire trimming operation requires only a very short time. The pipe, being under compression during the trimming operation, serves as a column to withstand the thrust of the moving carriage. The shape of the pipe in cross section is ideally adapted for this type of load.

The projections 43 determine the depth of cut made by the cutters and are designed to preserve a uniform thickness of pipe wall. Because of the details of the construction hereinbefore described, a uniform surface is produced at the welded seam, the flash being entirely removed therefrom.

The fact that the force necessary to move the tool carriers is applied along the axis of the pipe makes it possible to design the superstructure 11 of lighter construction than would otherwise be required.

Although I have illustrated and described but a single embodiment of my invention, it is not my intention to be limited thereto since my invention may be practiced in other forms within the scope of the appended claims.

I claim:

1. A flash-trimming machine for double-welded pipe comprising a movable carriage having side arms and a mandrel adapted to enter a pipe length received between said arms, tool carriers connected to the ends of said side arms and mandrel, rollers on said carriers adjacently disposed, rolls for supporting a double-welded pipe between said side arms and surrounding said mandrel coaxially therewith, cutting tools on said carriers adapted to engage the flash adhering to the seams in said pipe, and means for moving said carriage with respect to said pipe whereby to remove the flash from the length of said seams in one operation.

2. In a machine for trimming the flash from the seams of welded pipe, a shiftable carriage including an open ended frame movable to embrace a length of pipe, a mandrel within the frame and secured thereto at one end adapted to penetrate a length of pipe embraced by said frame, tool carriers connected to the ends of said frame and mandrel remote from their point of connection, a series of rolls for supporting a welded pipe coaxially with respect to said mandrel, rollers on said carriers for engaging said pipe externally and internally, pivoted cutting tools on said carriers adapted to engage the flash adhering to the seams in said pipe, and means for moving said carriage with respect to said pipe whereby the flash is removed from the length of said seams in one operation.

3. Apparatus for trimming flash from axial seams in a welded pipe comprising means for supporting a pipe against axial movement, means whereby a pipe may be moved into engagement with said means, a carriage movable axially over the pipe, a mandrel for entering the pipe, common means for actuating the carriage and mandrel, and means on said carriage and mandrel for removing flash on movement thereof relative to said pipe while the latter is supported by said first-mentioned means.

4. Apparatus for trimming flash from welded pipe comprising means whereby a pipe may be moved into position for the trimming operation, means for supporting the pipe against axial movement in such position, a carriage movable axially over the pipe and a mandrel for entering the pipe while so supported, and means on the mandrel and carriage for trimming flash, guiding means on the mandrel and carriage and common operating means for the mandrel and carriage.

5. Apparatus for working on welded pipe comprising an abutment, means whereby a pipe may be moved against said abutment, a carriage movable axially over the pipe and a mandrel for entering the pipe while the latter is adjacent the abutment, common means for actuating the carriage and mandrel, and guide means and cutters on said carriage and mandrel for engaging the pipe on movement of the carriage and mandrel relative thereto.

6. Pipe working apparatus comprising a stop, a roll table for delivering a pipe against said stop, a carriage overlying said table and movable therealong, a mandrel extensible between said carriage and table, common operating means for the mandrel and carriage, and cutters carried by the mandrel and carriage for trimming flash from welded seams in a pipe resting on said table.

7. Apparatus for working on welded pipe comprising a stop, a roll table for delivering a pipe to a position adjacent said stop, a carriage overlying a pipe so supported and movable therealong, a mandrel adapted to enter the pipe movable with said carriage, and means on said mandrel and carriage for removing the flash from welded seams in said pipe.

8. Flash trimming apparatus for welded pipe comprising a stop, a conveyor for delivering a pipe into a position adjacent the stop, a yoke overlying the pipe in such position and movable therealong, a mandrel movable with the yoke for entering the pipe, means for actuating the yoke and mandrel, and means on the yoke and mandrel for trimming flash from seams in said pipe.

9. Apparatus for working welded pipe comprising means for supporting a pipe against axial thrust, a substantially semi-cylindrical yoke movable along a pipe so supported, a mandrel movable with said yoke for entering the pipe, guide rolls and cutters on said yoke and mandrel for engaging the pipe adjacent welded seams therein and trimming flash therefrom, respectively.

10. Flash trimming apparatus for welded pipe comprising an abutment, a roll table for delivering the pipe axially toward said abutment, rails extending along said table, a carriage movable on said rails, a mandrel extensible into a pipe supported on said table, means for supporting the mandrel within the pipe, and cutters on said mandrel and carriage for trimming flash from welded seams in the pipe.

11. In apparatus for concurrently removing surplus metal from opposite faces of a welded seam or the like, a structure for supporting and positioning the material carrying the seam, a ram movable longitudinally and in a path corresponding in direction to the length of the positioned seam and adapted to overlie opposite faces of the positioned seam prior to the metal-removing action, and cutting tools carried by the ram and relatively positioned to concurrently cut the surplus metal from the positioned seam by ram movements in one direction, said tools being mounted for individual yielding automatically by movement of the material relatively to the ram in placing the seam in position for metal-removing action.

12. In apparatus for concurrently removing surplus metal from opposite faces of a welded seam or the like, a supporting structure for the material carrying the seam, and means for cutting the surplus metal from the seam concurrently on opposite faces of the seam, said means including a longitudinally movable ram having a pair of rigid arms spaced to cause the ram to span the seam with the path of travel of the arms corresponding in direction to the length of the seam, and a cutting tool assembly individual to and carried by each arm, said assemblies presenting the respective cutting tools in opposed relationship, each assembly being positioned to permit its cutting tool to traverse the length of a face of the seam by movement of the ram in one direction to remove the surplus metal of such face, said assembly being mounted to yield automatically by movement of the material and its seam to supported position.

13. A machine for the purpose described including a longitudinally reciprocable structure having spaced parallel portions, tools carried by said portions with their cutting edges in opposed and spaced apart relation to engage opposite sides of work, means on said portions effective to span a seam of the work and to engage opposite sides of the work, means for supporting the work in position to be engaged at its opposite sides by said tools, and means for reciprocating said structure.

JOHN W. FREE.